(12) United States Patent
Spindler et al.

(10) Patent No.: US 9,904,742 B2
(45) Date of Patent: Feb. 27, 2018

(54) METHOD OF GENERATING SEARCH TREES AND NAVIGATION DEVICE

(71) Applicant: Harman Becker Automotive Systems GmbH, Karlsbad (DE)

(72) Inventors: Carsten-Christian Spindler, Karlsruhe (DE); Marcus Heitmann, Eching (DE); Stefan Baptist, Munich (DE); Jeurgen Welscher, Markt Schwaben (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 481 days.

(21) Appl. No.: 14/348,108

(22) PCT Filed: Sep. 28, 2012

(86) PCT No.: PCT/EP2012/069233
§ 371 (c)(1),
(2) Date: Mar. 28, 2014

(87) PCT Pub. No.: WO2013/045642
PCT Pub. Date: Apr. 4, 2013

(65) Prior Publication Data
US 2014/0236995 A1    Aug. 21, 2014

(30) Foreign Application Priority Data
Sep. 30, 2011    (EP) .................................... 11183544

(51) Int. Cl.
*G06F 17/30*    (2006.01)
*G06F 17/27*    (2006.01)
*G06F 3/023*    (2006.01)

(52) U.S. Cl.
CPC ...... *G06F 17/30961* (2013.01); *G06F 3/0237* (2013.01); *G06F 17/276* (2013.01);
(Continued)

(58) Field of Classification Search
CPC ......... G06F 17/30241; G06F 17/30625; G06F 17/30091; G06F 17/30961;
(Continued)

(56) References Cited

U.S. PATENT DOCUMENTS

| | | | |
|---|---|---|---|
| 2004/0021691 A1 | 2/2004 | Dostie et al. | |
| 2010/0306249 A1* | 12/2010 | Hill | .......... G06F 17/30867 707/769 |
| 2012/0173500 A1* | 7/2012 | Chakrabarti | ....... G01C 21/3611 707/706 |

FOREIGN PATENT DOCUMENTS

| | | |
|---|---|---|
| EP | 1455163 A2 | 9/2004 |
| EP | 2184686 A1 | 5/2010 |

(Continued)

OTHER PUBLICATIONS

Kovacs L et al: "Implementation of sentence parser for Hungarian language in natural language processing", Applied Machine Intelligence and Informatics (SAMI), 2010 IEEE 8th International Symposium on, IEEE, Piscataway, NJ, USA, Jan. 28, 2010(2810-01-28), pp. 59-63.
(Continued)

*Primary Examiner* — Monica Pyo
(74) *Attorney, Agent, or Firm* — Artegis Law Group, LLP

(57) ABSTRACT

A method of generating search trees (25, 27) indicating next valid characters for an input interface of a navigation device includes determining a search sub-tree (29) which indicates next valid characters for both a subset of a first set of character strings and for a different second set of character strings. A first search tree (25) is generated based on information on the first set of character strings, and a second search tree (27) is generated based on information on the second set of character strings. The first search tree (25) is generated such that a node (26) of the first search tree (25) references the search sub-tree (29). The second search tree
(Continued)

(27) is generated such that another node (28) of the second search tree (27) references the search sub-tree (29).

15 Claims, 6 Drawing Sheets

(52) U.S. Cl.
CPC .. *G06F 17/30241* (2013.01); *G06F 17/30625* (2013.01); *G06F 17/30985* (2013.01)

(58) Field of Classification Search
CPC ......... G06F 17/30985; G06F 17/30327; G06F 17/30684; G06F 17/30867
USPC ........ 707/769, 770, 771, 772, 777, 778, 797
See application file for complete search history.

(56) References Cited

FOREIGN PATENT DOCUMENTS

| | | | |
|---|---|---|---|
| WO | 2008/005808 | A2 | 1/2008 |
| WO | 2008/106729 | A1 | 9/2008 |

OTHER PUBLICATIONS

International Search Report for PCT/EP2012/069233, dated Nov. 2, 2012.
European Search Report for 11183544.3, dated Dec. 21, 2011.

* cited by examiner

METHOD OF GENERATING SEARCH TREES AND NAVIGATION DEVICE

TECHNICAL FIELD

Embodiments of the invention relate to data base search for use in navigation devices. Embodiments of the invention relate in particular to a method of generating search trees which indicate next valid characters for inputting names at an input interface of a navigation device, and to a navigation device using such search trees.

BACKGROUND

Navigation devices are known which perform functions such as route searches between two locations. Modern navigation devices also may provide additional functionalities, such as serving as a travel guide that outputs, upon demand, information on points of interest (POI). Such information may include names of streets or POIs, but may also include additional textual or multimedia information. For illustration, some navigation devices may include travel guide functions to output detailed explanations, in textual and/or multimedia form, on objects, in response to receiving a name input.

In order to aid a user in inputting names, navigation devices may be configured to provide information on all potential next valid characters. This reduces or eliminates the risk that the user inputs a name which is not regarded valid by the navigation device. For illustration, by providing information on next valid characters and/or by limiting possible character inputs based on information on next valid characters, the inputting of a destination city or destination street may be prevented if the navigation device does not store information on the location of the respective city or street.

Information on next valid characters should desirably be provided without substantial delays, i.e., while the user is still in the process of inputting a name. In order to allow information on next valid characters to be retrieved quickly, dedicated search structures may be used. Such search structures may be specific search trees, which are also referred to as next valid character (NVC) trees. NVC trees may be used for different search paths. For illustration, there may be a NVC tree for valid city names in one country, such as Germany, and another NVC tree for valid city names in another country. There may be a NVC tree for valid road names in one city, and another NVC tree for valid road names in other cities. Leafs of the NVC tree may point to data base objects, for example. Alternatively, leafs of the NVC trees may also merely indicate that there are no valid names which include more characters, or may point to other data structures. For illustration, a leaf of NVC tree which indicates next valid characters for country names may point to a root node of another NVC tree which stores next valid characters for all cities in the respective country, or similar.

When a large number of possible names must be accommodated, storage space requirements for storing the various NVC trees may be significant. The addition of ever more functionalities, such as travel guide functionalities, which may also call for a verification of the validity of name input during the ongoing inputting of characters, may further increase such storage space requirements.

SUMMARY

Accordingly, there is a need for methods and navigation devices which allow storage space requirements for next valid character (NVC) trees to be reduced.

According to exemplary embodiments, a method and a navigation device as recited in the independent claims are provided to address these needs. The dependent claims define further embodiments.

According to an embodiment, a method of generating search trees which indicate next valid characters for an input interface of a navigation device is provided. Information on a first set of character strings and information on a second set of character strings is retrieved. The first and second sets are different from each other, but do not need to be disjoint. Based on the information on the first set and the information on the second set, a search sub-tree is determined which indicates next valid characters for both a subset of the first set of character strings and another subset of the second set of character strings. A first search tree is generated based on the information on the first set. A second search tree is generated based on the information on the second set. The first search tree and the second search tree are generated and stored in a data base such that a node of the first search tree references the search sub-tree, and that another node of the second search tree references the search sub-tree.

By identifying the search sub-tree which indicates next valid characters for both a subset of the first set of character strings and another subset of the second set of character strings, redundancies may be reduced. Portions of NVC trees which are identical do not need to be stored plural times. Rather, one and the same sub-tree may be referenced both by a node of the first search tree and by a node of the second search tree.

The search sub-tree indicates next valid characters and is referenced by both a node of the first search tree and a node of the second search tree. This allows search trees to be stored in a way which is efficient in terms of storage space. The search sub-tree may include plural nodes, with at least one of the nodes referencing another one of the nodes of the search sub-tree, so as to indicate next valid characters. The search sub-tree may include plural nodes, with a plurality of the nodes respectively referencing at least two other nodes of the search sub-tree, so as to indicate next valid characters. The search sub-tree may indicate next valid characters and may be referenced by both a search tree for next valid characters of city or road names and by another search tree for next valid characters of points of interest.

To determine the search sub-tree, a first provisional search tree may be generated based on the information on the first set, wherein the first provisional search tree has a leaf node for each character string included in the first set. A second provisional search tree may be generated based on the information on the second set, wherein the second provisional search tree has a leaf node for each character string included in the second set. The first provisional search tree and the second provisional search tree may be compared to each other to determine the search sub-tree. The first provisional search tree may be a conventional NVC tree for the first set of character strings. The second provisional search tree may be a conventional NVC tree for the second set of character strings. By comparing such complete NVC search trees to each other, identical portions of the different search trees may be identified easily and reliably.

To determine the search sub-tree, a portion of the first provisional search tree may be identified which is identical to a portion of the second provisional search tree. Thereby, redundant information may be reduced or eliminated efficiently.

The first search tree may be generated based on the first provisional search tree. To this end, the first provisional search tree may be truncated by removing search paths included in the search sub-tree from the first provisional search tree. A reference to the search sub-tree may be added at a node of the truncated first provisional search tree. With such a structure, portions of search paths which correspond, for example, to name terminations (such as " . . . street", " . . . strasse", " . . . platz"), may be removed from the first provisional search tree to generate the first search tree. By adding the reference to the search sub-tree, a NVC search path which starts in the first search tree may be continued in the search sub-tree, which is different from the first search tree.

The second search tree may include the search sub-tree. The node of the first search tree may references a node of the second search tree which is included in the search sub-tree. Thereby, the second search tree may still represent, of its own, a complete NVC search tree. A portion of the second search tree, which represents sub-strings of some of the character strings included in the first set of character strings, may be referenced by the first search tree to reduce redundancy.

Alternatively, the search sub-tree may be separate from both the first search tree and the second search tree. In this case, generating the second search tree may comprises truncating the second provisional search tree by removing search paths included in the search sub-tree from the second provisional search tree. A reference to the search sub-tree may be added at a node of the truncated second provisional search tree.

The first search tree, the second search tree and the search sub-tree may be stored separately in a data base. Alternatively, the second search tree may be stored as a portion of one of the first and the second search trees. The data base may be a relational data base. The first search tree, the second search tree and, if applicable, the search sub-tree may be stored as binary large objects (BLOBs).

The first set of character strings and the second set of character strings may be selected from country names, city names, street names, or names of points of interest (POI). For illustration, the different sets of character strings may correspond to valid street names for different cities, or city districts, in one country.

The method is performed automatically by an electronic computing device. The information on the first set of character strings may be the set of character strings itself. The information on the second set of character strings may be the set of character strings itself. Alternatively, the information may already have undergone some processing. For illustration, to generate a set of search trees which have reduced redundancy, conventional NVC trees for the first set of character strings and for the second set of character strings may be retrieved as input, and may be processed to identify portions of search paths which are identically included in at least two of the conventional NVC trees search trees.

The method may be applied to more than two sets of character strings. For illustration, a search sub-tree may be referenced by nodes of more than two search trees. There may also be more than one search sub-tree. For illustration, there may be a search sub-tree which is referenced by nodes of a pair of search trees, and another search sub-tree which is referenced by nodes of another pair of search trees. A search tree may also reference plural different search sub-trees.

According to another embodiment, a navigation device data base is provided. The data base stores plural search trees which respectively indicate next valid characters for a name input received at an input interface of the navigation device, wherein a first search tree has a first node referencing a search sub-tree and a second search tree has a second node referencing the same search sub-tree. The search sub-tree may indicate next valid characters both for a name search which starts at a root node of the first search tree, and for a name search which starts at a root node of the second search tree. The data base may be a data base generated with a method of any one aspect or embodiment described herein.

According to another embodiment, a navigation device is provided. The navigation device comprises an input interface configured to receive character input in a sequential manner. The navigation device comprises a data base storing plural search trees which respectively indicate next valid characters for a name input received at the input interface, wherein a first search tree has a first node referencing a search sub-tree and a second search tree has a second node referencing the same search sub-tree. The navigation device comprises a processing device coupled to the input interface and the data base to perform a next valid character search. The processing device is configured to determine, when at least one character input is received at the input interface, next valid characters using at least one of the plural search trees stored in the data base. The processing device is also configured to selectively continue the next valid character search in the search sub-tree when reaching either one of the first node of the first search tree or the second node of the second search tree.

By configuring the processing device such that it may continue a NVC search in the search sub-tree, use may be made of the search trees which have reduced redundancy.

The search sub-tree indicates next valid characters and is referenced by both a node of the first search tree and a node of the second search tree. This allows search trees to be stored in a way which is efficient in terms of storage space. The search sub-tree may include plural nodes, with at least one of the nodes referencing another one of the nodes of the search sub-tree, so as to indicate next valid characters. The search sub-tree may include plural nodes, with a plurality of the nodes respectively referencing at least two other nodes of the search sub-tree, so as to indicate next valid characters. The search sub-tree may indicate next valid characters and may be referenced by both a search tree for next valid characters of city or road names and by another search tree for next valid characters of points of interest.

The data base may store plural search sub-trees, each of which is respectively referenced by nodes of at least two different search trees. Thereby, storage space requirements may be reduced further.

The processing device may be configured to pre-load the search sub-tree prior to reaching the first node or the second node in the next valid character search. The processing device may be configured such that the search sub-tree is pre-loaded when performing a NVC search starting at a root node of one of the first and second search trees, and to utilize the pre-loaded search sub-tree when subsequently performing a NVC search starting at a root node of the other one of the first and second search trees.

The search sub-tree may be included in one of the first search tree and the second search tree. The search sub-tree may be stored in the data base separately from the first search tree and the second search tree. The effects respectively attained thereby correspond to the effects described in the context of methods of embodiments.

Each one of the first and second search trees may indicate next valid characters for country names, city names, street names, or names of POIs.

The navigation device may be a navigation device for vehicular navigation. The navigation device may be fixedly installed in a vehicle. The navigation device may be a portable navigation device.

It is to be understood that the features mentioned above and those to be explained below can be used not only in the respective combinations indicated, but also in other combinations or in isolation.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION

While embodiments of the invention will be described with reference to the drawings in specific contexts hereinafter, it is to be understood that various modifications and alterations may be made to the embodiments.

Figure 1:
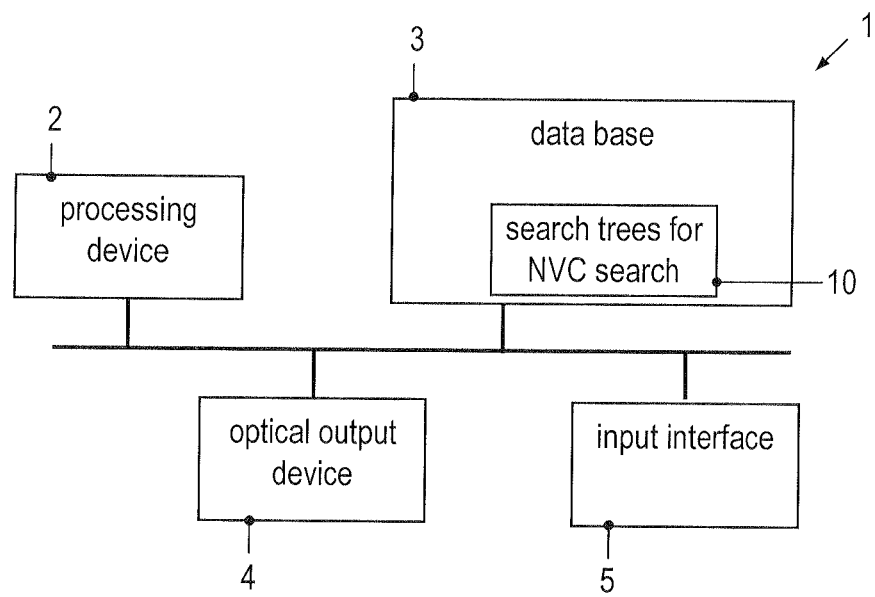
FIG. 1 is a schematic block diagram of a navigation device.

FIG. 1 schematically illustrates a vehicle navigation device 1 according to an embodiment. The navigation device 1 comprises a processing device 2 controlling the operation of the navigation device 1, e.g. according to control instructions stored in a memory. The processing device 2 may comprise a central processing unit, for example in form of one or more processors, digital signal processing devices or application-specific integrated circuits. The navigation device 1 further includes a data base 3. The data base 3 may comprise any one, or any combination, of various types of storage or memory media, such as random access memory, flash memory or a hard drive, but also removable memories such as a compact disk (CD), a DVD, a memory card or the like. The navigation device 1 also includes an output interface 4 for outputting information to a user. The output interface 4 may include an optical output device, an audio output device, or a combination thereof. The navigation device 1 also includes an input interface 5 which allows a user to input characters in a sequential manner. The input interface 5 may allow a user to input textual information or voice information.

The navigation device may include additional components, such as a position sensor and/or a wireless receiver and/or a vehicle interface. The position sensor may be adapted to determine the current position of the vehicle in which the navigation device 1 is installed. The position sensor may comprise a GPS (Global Positioning System) sensor, a Galileo sensor, a position sensor based on mobile telecommunication networks and the like. The wireless receiver may be configured to receive information for updating the data base stored in the storage device 3. The vehicle interface may allow the processing device 2 to obtain information from other vehicle systems or vehicle status information via the vehicle interface. The vehicle interface may for example comprise CAN (controller area network) or MOST (Media Oriented devices Transport) interfaces.

The data base 3 includes data 10 which represent search trees for performing next valid character (NVC) searches. Some or all of the search trees for NVC searches may correspond to names of various objects. Examples include names of valid destinations, such as destination countries, destination cities, or destination streets. Some of the search trees for performing the NVC searches may also correspond to other names, such as names of POIs or names for which there are entries in an electronic travel guide.

The processing device 2 may access and utilize the data 10 when a user starts inputting a name. For illustration, the processing device 2 may determine possible next valid characters in response to a sub-string which was already entered by a user at the input interface 5. The processing device 2 may control the optical output device 4 to output the next valid characters. Alternatively or additionally, the processing device 2 may control the input interface 5 so as to prevent, or otherwise bar, the inputting of characters which do not correspond to next valid characters. When performing a NVC search, the processing device 2 may start at a root node of a search tree. The search tree may be selected based on the type of name which is to be input, such as country or city or road. As will be described in more detail in the following, the navigation device 1 uses search trees for performing a NVC search which have reduced redundancy as compared to conventional NVC trees. This is attained by allowing several search trees to reference, i.e. point to, one and the same search sub-tree. Thereby, substrings which are identically encountered in different sets of character strings may be accommodated, without requiring the corresponding search paths to be always stored plural times.

Figure 2:
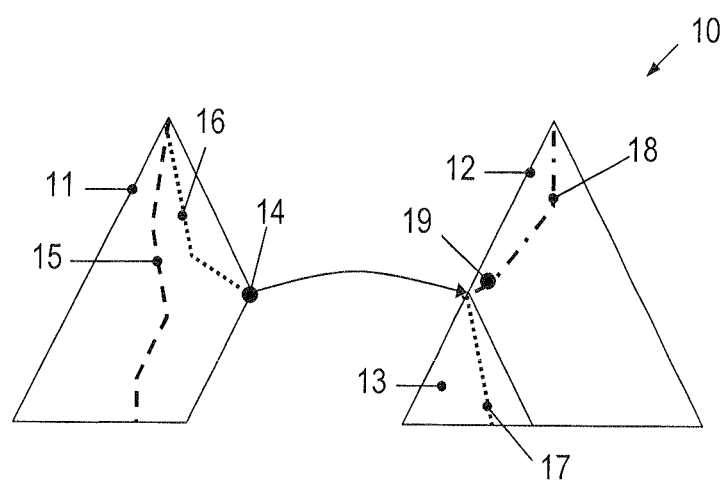
FIG. 2 is a schematic representation of search trees for performing a next valid character search.

FIG. 2 is a schematic representation of data 10 which include plural search trees for performing NVC searches. The data 10 may be included in different portions of the data base 3. For illustration, if the data base 3 includes separate sections, or layers, for names or for POIs, the data 10 may be included in the respective section or layer.

The data 10 includes a first search tree 11 and a second search tree 12. For illustration rather than limitation, the search tree 11 may represent names of streets in one geographical area and the search tree 12 may represent names of streets in another geographical area different from the one geographical area. Both the first search tree 11 and the second search tree 12 represent next valid characters for name input at the input interface 5 of the navigation device. For illustration, depending on the country and city which was previously input, one of the search trees 11, 12 is selected for performing a NVC search. As more characters of a name, e.g. a street name, are successively entered, a search path is traversed in the respective search tree 11, 12. The search trees 11, 12 may respectively be organized such that the child nodes of the current node represent the next valid characters. The processing device 2 may readily retrieve these next valid characters and may output them via the optical output device 4 and/or may control the input interface 5 based on the next valid characters retrieved from the respective search tree 11, 12. Different search trees may be associated with different geographic areas, so that the various paths which may be taken along the search tree represent the names of all objects known to the navigation device and located in the respective area.

Contrary to conventional NVC trees, a node 14 of the first search tree 11 points to a search sub-tree 13. As illustrated in FIG. 2, the search sub-tree 13 may be included in the second search tree 12. The search sub-tree 13 may include name terminations which are valid name terminations both for some names of the set of names represented by the first tree 11 and for some strings of the set of names represented by the second tree 12. For illustration, the name terminations " . . . erplatz" or " . . . erstrasse" may be valid endings both when a user inputs the initial characters "Schill . . . ", included in the set of names represented by the search tree 11, and when the user inputs the initial characters "Bruckn . . . ", included in set of names represented by the search tree 12. Rather than storing the associated portions of the search path which correspond to this name termination both in the first tree and the second tree, the node 14 of the first search tree 11 references the search sub-tree 13.

In operation, when the processing device accesses different nodes of the first search tree 11, the search may traverse a path 16 which ends at node 14. The reference to the search sub-tree stored at the node 14 then causes the processing device 2 to continue the search at a node of the search sub-tree 13, to identify valid characters for the remainder of the name which has not yet been input.

References to a separate search sub-tree may be provided only along some of the paths of the first search tree 11. There may be search paths 15 which can be traversed in the first search tree 11 without being referred to any separate search sub-tree.

The search sub-tree 13 is not only referenced by the node 14 of the first search tree 11, but is also referenced by a parent node 19 in the second search tree 12. This reflects that the search sub-tree 13 represents possible sub-strings for names starting with a string represented by node 14 of the first search tree 11, but also for names starting with a string represented by node 19 of the second search tree 12. When a user inputs initial characters of a string while the processing device uses the second search tree 12 to identify next valid characters, a search path 18 may be traversed. When node 19 is reached, the NVC search continues in the search sub-tree 13.

It will be appreciated that the search sub-tree 13 which is referenced by nodes of plural search trees 11, 12 may have any number of branching nodes and/or levels. In particular, the search sub-tree 13 may include a plurality of branching nodes, which are parent nodes for respectively at least two child nodes. For illustration, when the first set of character strings includes the names "Schillerstrasse", "Schillerplatz", "Schillerallee", and "Schillermuseum", and the second set of character strings includes the names "Brucknerstrasse", "Brucknerplatz", "Brucknerallee", and "Brucknermuseum", the search sub-tree 13 may have branching nodes which correspond to the different name terminations " . . . erstrasse", " . . . erplatz", " . . . erallee" and " . . . ermuseum", all of which are valid when the user either starts by inputting "Schill . . . " when the search is started in one search tree or when or starts by inputting "Bruckn . . . " when the search is started in another search tree.

If the leaf nodes of the search trees 11, 12 point to an object in the data base 3, several pointers may be stored in each leaf node of the common search sub-tree 13. For illustration, the leaf node reached in path 17 may contain two different pointers. One of the pointers may be used when the leaf node of path 17 is reached when starting the NVC search in the first search tree 11.

Another one of the pointers may be used when the leaf node of path 17 is reached when starting the NVC search in another search tree, such as search tree 12. The processing device 2 may keep track of the search history. A disambiguation between different pointers stored at one leaf node of the common search sub-tree 13 may be performed based on the search history.

If the leaf nodes of the search trees merely indicate that there are no names which include additional characters, but do not point to other objects in the data base 3, such a disambiguation may not be required.

Figure 3:
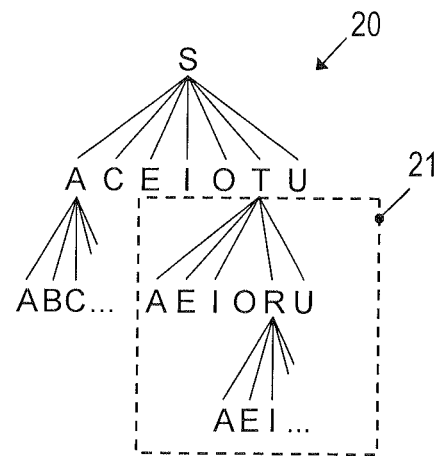
FIG. 3 is a schematic representation of data entries of a search tree for performing a NVC search.

FIG. 3 illustrates a search tree 20 for performing a NVC search in greater detail. Nodes of the search tree 20 may correspond to different characters. The characters may be alphanumerical characters. Each node represents a sequence of characters input at the input interface 5. The child nodes of a node represent the possible next valid characters, once the respective node has been reached. A search sub-tree 21 which would normally be included in plural different search trees may be stored only once. There may be plural parent nodes which reference, i.e. point to, the search sub-tree 21.

Figure 4:
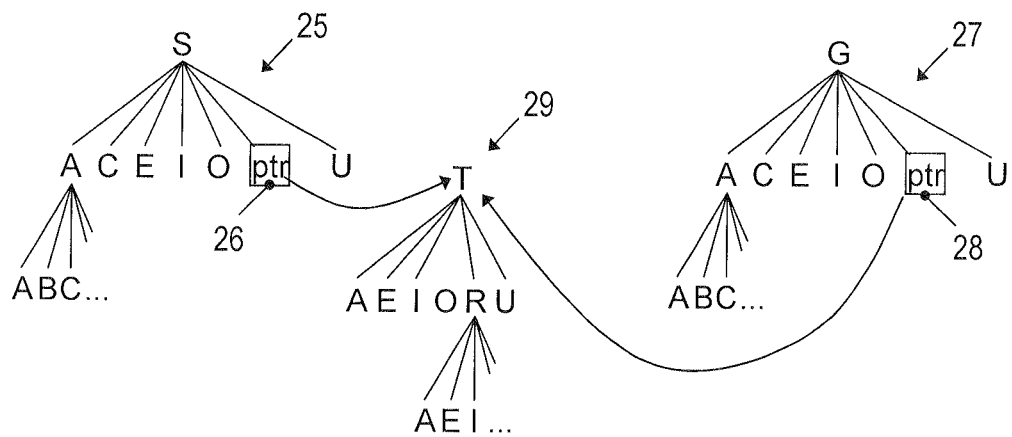
FIG. 4 illustrates a modification of the search tree structure of FIG. 3 according to an embodiment.

FIG. 4 illustrates search trees for performing NVC searches. The search trees include a first search tree 25, a second search tree 27, and search sub-tree 29. The search sub-tree 29 may be stored separately from both the first search tree 25 and the second search tree 27. The search sub-tree 29 represents valid sub-strings of names which have initial characters identified by the first search tree 25, and valid sub-strings of names which have initial characters identified by the second search tree 27. Correspondingly, the first search tree 25 has a node 26 which contains a pointer to the search sub-tree 29. The second search tree 27 has another node 28 which contains a pointer to the search sub-tree 29. By allowing the search sub-tree 29 to be referenced by parent nodes in plural different search trees 25, 27, redundancy may be reduced. The plural different search trees 25, 27 may correspond to different geographical areas, such as different countries, different cities, or different city districts.

Figure 5:
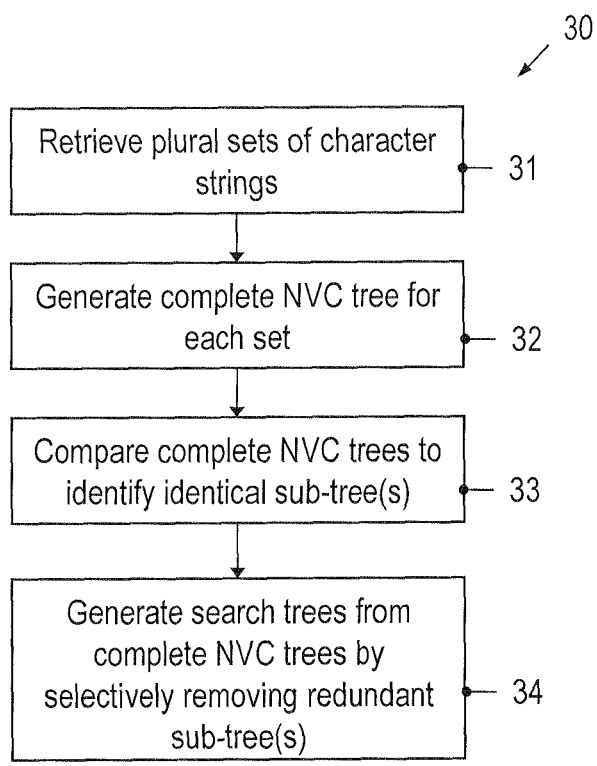
FIG. 5 is a flow chart of a method of an embodiment.
Figure 6:
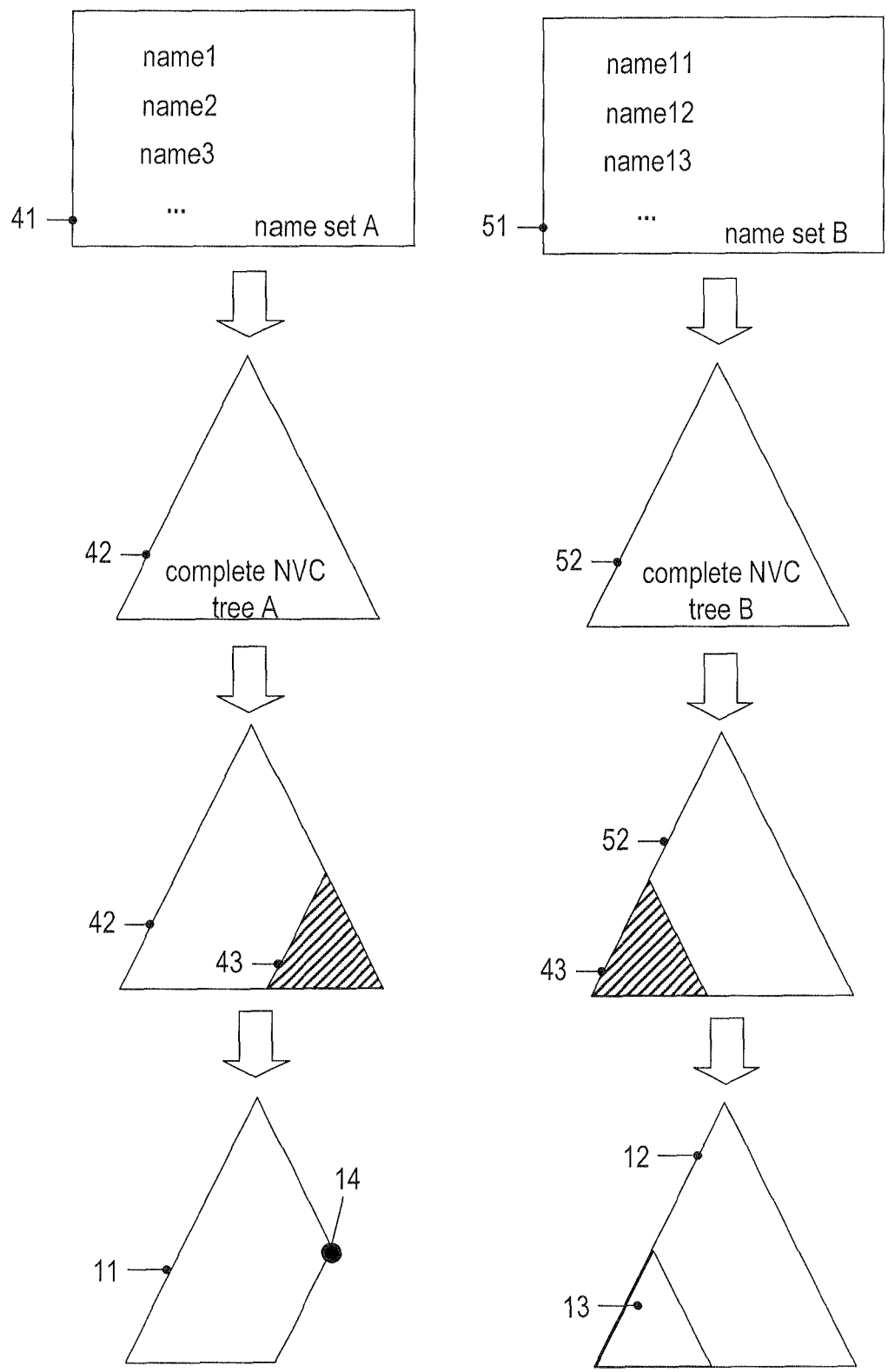
FIG. 6 is a schematic view illustrating data processing in the method of FIG. 5.

Referring to FIGS. 5 and 6, a method of generating search trees for performing NVC searches according to embodiments will be described. Generally, a search sub-tree is determined which represents sub-strings of next valid characters for different sets of character strings. For illustration, one set of character strings may correspond to the names of cities in on country, and the other set of character strings may correspond to the names of cities in another country. For further illustration, one set of character strings may correspond to the names of streets in on city of a given country, and the other set of character strings may correspond to the names of cities in another city of the same country. For further illustration, one set of character strings may correspond to POIs in one city, and the other set of character strings may correspond to POIs in another city.

One or plural search sub-tree(s) may be determined in various ways. For illustration, as will be explained with reference to FIGS. 5 and 6, conventional NVC trees may be generated and compared to identify an identical portion. Other implementations are possible, which may be based, for example, on directly parsing the character strings of different sets of characters to identify common groups of possible sub-strings.

FIG. 5 is a flow chart of a method 30 of an embodiment. The method may be performed automatically by an electronic computing device when preparing a data base for use in a navigation device. The method 30 may be performed off board a vehicle.

At 31, plural sets of character strings are retrieved. The sets may be retrieved from electronic map data, electronic cadastral maps, or from a user input.

At 32, a conventional, complete NVC tree is generated for each set. This may be done by parsing the set of character strings, for each set, to identify character strings which have common initial sub-strings. The complete NVC trees serve as provisional search trees which are processed further to generate search trees having reduced redundancy.

At 33, the complete NVC trees are compared to each other to identify one or several sub-tree(s) which are identically included in at least two of the different complete NVC trees. Not all sub-tree(s) contained in at least two of the complete NVC trees may be of interest as far as reducing storage space requirements are concerned. For illustration, only sub-trees which have a certain size may be taken into account. For illustration, the search at 33 may be performed to identify sub-trees which have a number of branching nodes which is greater than a threshold, and/or which have a total number of child nodes which is greater than a threshold, and/or which have a total number of nodes which is greater than a threshold.

At 34, plural search trees are generated from the complete NVC trees. To this end, at least some of the complete NVC trees are truncated by removing therefrom the search paths which are included in one of the sub-tree(s) identified at 33. A pointer to the sub-tree is added at a node of the respective truncated NVC tree.

The plural search trees may be stored in a data base. If a search sub-tree is stored separately from the search trees, it is also stored in the data base. The data base may subsequently be deployed to navigation systems.

The plural search trees and the one or several search sub-tree(s) may be generated in various ways. For illustration, if two or more of the conventional, complete NVC trees generated at 32 share a sub-tree, only one of these complete NVC trees may be truncated. The search sub-tree may remain a part of the other complete NVC tree, which thus functions as search tree. Entries at leaf nodes of the search sub-tree may be adapted to account for the fact that such leaf nodes may be reached in NVC searches starting at different search trees. For illustration, each leaf nodes of the search sub-tree may store plural pointers or other data, with each pointer or data being associated with a different search history.

For further illustration, if two or more of the conventional, complete NVC trees generated at 32 share a sub-tree, all of these NVC trees may be truncated. The identified sub-tree may be stored separately. Entries at leaf nodes of the thus generated search sub-tree may be adapted to account for the fact that such leaf nodes may be reached in NVC searches starting at different search trees. Pointers to the search sub-tree are added at nodes of each one of the different truncated NVC trees.

Referring to FIG. 6, the method of FIG. 5 will be illustrated further. A first set of character strings 41 and a second set of character strings 51 are processed to generate search trees for a NVC search. The two sets 41, 51 are different. The two sets 41, 51 may even be disjoint in the sense that no character string of set 41 is included in character set 51 and vice versa. However, the two sets 41, 51 do not need to be disjoint.

Conventional complete NVC trees 42, 52 are generated. The NVC trees 42, 52 may be generated by parsing the respective sets of character strings.

Character strings may be grouped in accordance with sub-strings found at the beginning of the respective character strings. In other implementations, the method may start using the NVC trees 42, 52 as input.

The two complete NVC trees 42, 52 are compared to each other. An identical sub-tree portion 43 which is identically included in both NVC trees 42, 52 is identified.

The NVC tree 42 may be truncated by removing the sub-tree portion 43. The parent node of the sub-tree portion 43 in the complete NVC tree 42 may be replaced by a node 14 which stores a pointer, or otherwise references, the search sub-tree 13 which remains included in the second NVC tree. The parent node of the search sub-tree 43 is referenced both by node 14 of the first search tree 11 and by the parent node of the search sub-tree 43 in the second search tree 12. The second complete NVC tree 52 may be used as second search tree without any further modification in some implementations. In other implementations, the second search tree 12 may be generated from the second complete NVC tree 52 by adapting leaf nodes, so as to account of the fact that leaf nodes of the search sub-tree 13 may be reached both when starting in the first search tree 11 and when starting in the second search tree 12.

In other embodiments, both NVC trees 42, 52 may be truncated to generate the first and second search trees 11, 12, and the search sub-tree 13 may be generated based on the sub-tree portion 43 and may be stored separately from the first and second search trees 11, 12.

In still other embodiments, it is not required to generate the conventional, complete NVC trees 42, 52. For illustration, the search sub-tree as well as the first search tree and the second search tree which reference the search sub-tree may be determined by parsing the character strings of the first set 41 and of the second set 51.

In still other embodiments, the method may start using the complete NVC trees 42, 52 as input. Such complete NVC trees 42, 52 may be provided by vendors of electronic maps, for example.

The search trees and search sub-tree(s) may have any one of a variety of configurations, as will be illustrated further with reference to FIGS. 7-10. Each one of the various configurations of search trees may alternatively or additionally be used in the data 10 to store search trees for NVC searches.

Figure 7:
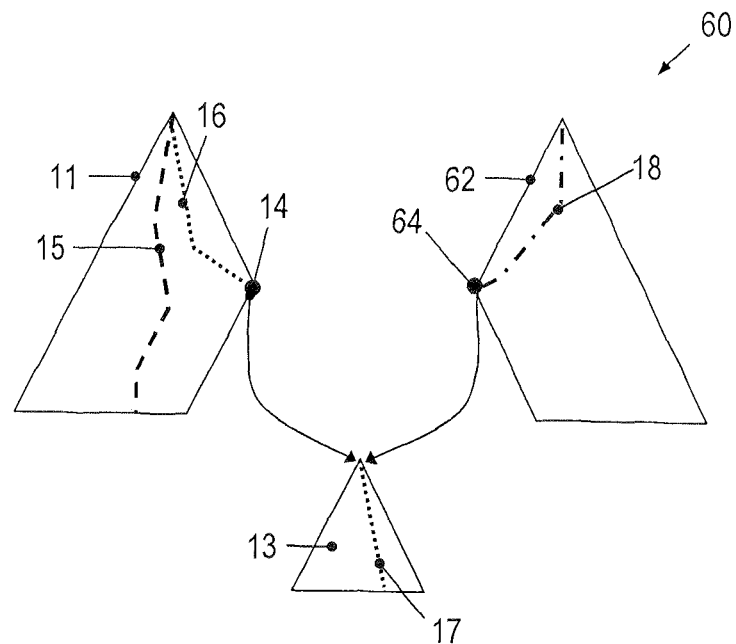
FIGS. 7-10 respectively are schematic representations of search trees for performing a next valid character search according to embodiments.

FIG. 7 is a schematic illustration of data 60 representing search trees 11, 62 and a search sub-tree 13 for performing NVC searches. In the data 60, the search sub-tree 13 is stored separately from the both the first search tree 11 and the second search tree 62. For illustration, the first search tree 11, the second search tree 62, and the search sub-tree 13 may be stored as separate binary large objects (BLOBs).

The first search tree 11 has a node 14 which references the search sub-tree 13. The second search tree 62 has a node 64 which references the search sub-tree 13. When node 14 is reached along search path 16, when a user inputs a sub-string of characters, the search continues in the search sub-tree 13 to identify the following next valid characters. Similarly, when node 64 is reached along search path 18, when a user inputs a sub-string of characters, the search continues in the search sub-tree 13 to identify the subsequent next valid characters of a name input.

When the data 60 are used in NVC searches, the search sub-tree 13 may be buffered for subsequent use. For illustration, the processing device 2 of the navigation device 1 may load the search sub-tree 13 when performing a NVC search starting at the second search tree 62. When another NVC search is subsequently performed starting at the first search tree 11, this buffered data may be used. This may help speed up NVC searches.

A search sub-tree may be referenced by more than two search trees. For illustration, there may be three or even more search trees, which respectively have a node that has a pointer to one and the same search sub-tree, as will be explained with reference to FIG. 8.

Figure 8:
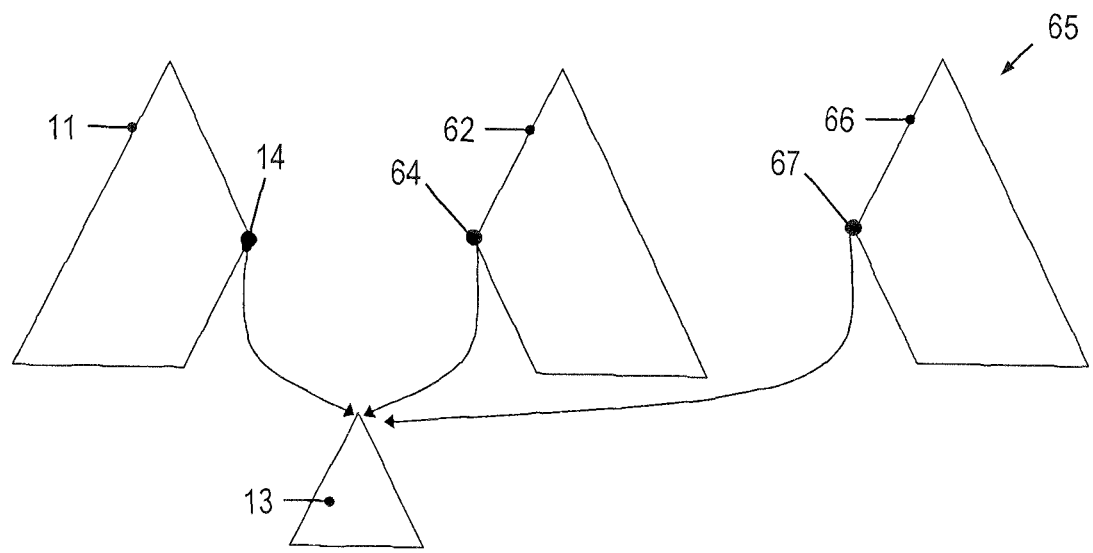

FIG. 8 is a schematic illustration of data 65 representing search trees 11, 62, 66 and a search sub-tree 13 for performing NVC searches. The first search tree 11 has a node 14 which references the search sub-tree 13. The second search tree 62 has a node 64 which references the search sub-tree 13. The third search tree 66 has a node 67 which references the search sub-tree 13. When node 14 is reached in a NVC search starting at the first search tree 11, or when node 64 is reached in a NVC search starting at the second search tree 62, or when node 67 is reached in a NVC search starting at the third search tree 64, the NVC search continues in the search sub-tree 13 to identify the following next valid characters.

While the data 65 illustrate the search sub-tree 13 as being stored separately from the first search tree 11, the second search tree 62, and the third search tree, the search sub-tree 13 may be included in either one of these trees.

The data base 3 may include plural search sub-trees. A search tree may have different nodes which each reference a different search sub-tree, as illustrated in FIG. 9.

Figure 9:
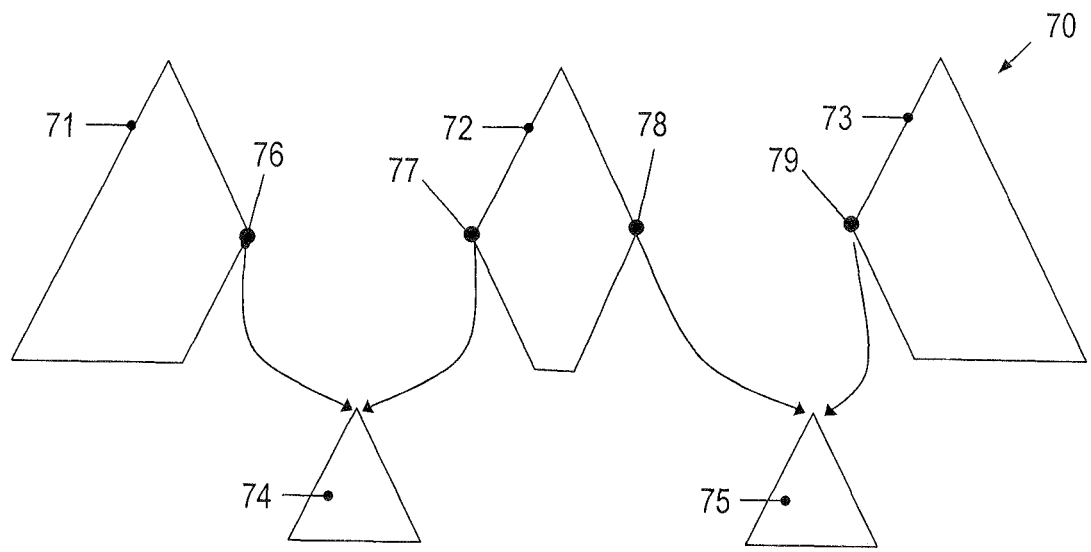

FIG. 9 is a schematic illustration of data 70 representing search trees 71, 72, 73 and first and second search sub-tree 74, 75 for performing NVC searches. A first search tree 71 has a node 76 which references the first search sub-tree 74. A second search tree 72 has a node 77 which also references the first search sub-tree 74. The first search sub-tree 74 represents next valid characters both for a NVC search which starts at the first search tree 71 and reaches node 76, and for a NVC search which starts at the second search tree 72 and reaches node 77.

The second search tree 72 has another node 78 which references the second search sub-tree 75. A third search tree 73 has a node 79 which also references the second search sub-tree 75. The second search sub-tree 75 represents next valid characters both for a NVC search which starts at the second search tree 72 and reaches node 78, and for a NVC search which starts at the third search tree 73 and reaches node 79.

While search sub-trees may correspond to name terminations, i.e., sub-strings of character strings located at the end of the respective character strings, this need not be the case. Rather, the principles of identifying a search sub-tree which represents sequences of characters that are next valid characters for different sets of character strings may be used also when the associated sub-strings are found in the center of names, for examples. This is illustrated in FIG. 10.

Figure 10:
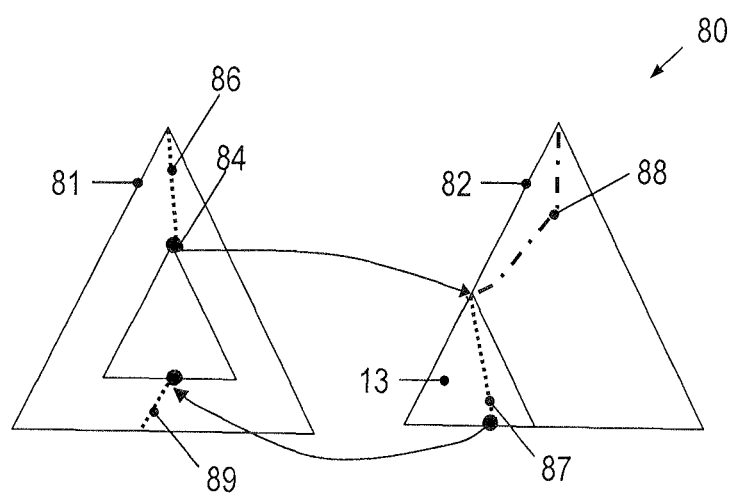

FIG. 10 is a schematic illustration of data 80 representing a first search tree 81 and a second search tree 82. The second search tree 82 includes a search sub-tree 13.

The search sub-tree 13 corresponds to sub-strings of next valid characters which are located in the middle of names represented by the first search tree 81 or at the end of names represented by the second search tree 82. The first search tree 81 has a node 84 which references the search sub-tree 13. A leaf node of the search sub-tree 13 may have two data, one of which references back to the first search tree 81. When a search is performed starting in the first search tree 81, node 84 may be reached along a search path 86 as a user inputs the first characters of a name. From node 84, the processing device 2 accesses the search sub-tree 13. The search may be continued along search path 87 through the search sub-tree 13 as the user continues to input characters of the name. At a leaf node of the search sub-tree 13, a disambiguation may be made to determine whether this leaf node was reached in a search starting in the first search tree 81 or in the second search tree 82. When the leaf node of the search sub-tree 13 is reached in a search starting in the first search tree 81, the leaf node may reference back to a node of the first search tree 81, or to yet another search sub-tree. As the user continues to input characters of the name, the search for next valid characters may be continued along path 89 in the first search tree 81.

Similarly, the processing device 2 may reach a leaf node of the common search sub-tree 13 also when starting a search in the second search tree 82. When the search is started in the second search tree 82, for example because the second search tree 82 corresponds to a city previously selected by the user, a search path 88 may be traversed as a user inputs the first characters of a name. From the parent node of the root node of search sub-tree 13, the search continues in the search sub-tree 13. When a leaf node of the search sub-tree 13 is reached, disambiguation based on the search history may be performed.

In the devices and methods of various embodiments, the character strings represented by the search trees for performing next valid character searches may be strings of alphanumerical characters. In the devices and methods of various embodiments, the search sub-tree and the plural search trees which reference the same search sub-tree may be generated such that they correspond to sub-strings of names which have a certain length. For illustration, each path in the search sub-tree may correspond to name sub-strings having a length of two, of three, or of more than three characters. The nodes in the search trees which reference the search sub-tree may correspond to name sub-strings having a length of at least two characters. In other words, the search sub-tree may in particular correspond to sub-strings which represent next valid characters both for some names of a first name set and for some names of a second name set.

While devices and methods according to embodiments have been described in detail, modifications may be implemented in other embodiments. For illustration, while search trees have been described in the context of street names, city names, or country names, the search trees may represent any one of a variety of different names, such as names of POIs.

For further illustration, while exemplary structures of index trees and their nodes have been explained, any suitable data structure may be used to implement the index tree. For illustration, the index tree may be in a relational data base.

Embodiments of the invention may be used for vehicle navigation devices, which may be portable devices or devices fixedly installed in the vehicle. Embodiments of the invention are not limited to being used in this particular field.

What is claimed is:

1. A method of generating search trees indicating next valid characters for an input interface of a navigation device, said method comprising:

retrieving information on a first set of character strings and information on a second set of character strings, said first and second sets being different from each other;

determining, based on said information on said first set and said information on said second set, a search sub-tree which indicates next valid characters for both a subset of said first set of character strings and another subset of said second set of character strings;

generating a first search tree based on said information on said first set and a second search tree based on said information on said second set, wherein said first search tree and said second search tree are generated such that a node of said first search tree references said search sub-tree and that another node of said second search tree references said search sub-tree, wherein the first search tree and second search tree comprise different search trees having no common nodes; and storing said search sub-tree, first search tree and said second search tree in a data base, wherein only one instance of the search sub-tree is stored in the data base for the first search tree and the second search tree.

2. The method of claim 1, wherein said determining comprises:
generating a first provisional search tree based on said information on said first set, wherein said first provisional search tree has a leaf node for each character string included in said first set;
generating a second provisional search tree based on said information on said second set, wherein said second provisional search tree has a leaf node for each character string included in said second set;
comparing said first provisional search tree and said second provisional search tree to determine said search sub-tree.

3. The method of claim 2, wherein said determining comprises:
identifying a portion of said first provisional search tree which is identical to a portion of said second provisional search tree.

4. The method of claim 3, wherein said generating said first search tree comprises:
truncating said first provisional search tree based on said identified portion; and
adding a reference to said search sub-tree at a node of said truncated first provisional search tree.

5. The method of claim 4,
wherein said second search tree includes said search sub-tree,
wherein said node of said first search tree references a node of said second search tree which is included in said search sub-tree.

6. The method of claim 3, wherein said generating said second search tree comprises:
truncating said second provisional search tree based on said identified portion; and
adding a reference to said search sub-tree at a node of said truncated second provisional search tree.

7. The method of claim 6, wherein said first search tree, said second search tree and said search sub-tree are stored as separate binary large objects.

8. The method of claim 1, wherein said first set of character strings and said second set of character strings are selected from country names, city names, street names, or names of points of interest (POI).

9. The method of claim 1, further comprising:
retrieving information on at least one further set of character strings different from said first set and said second set;
wherein said search sub-tree is determined based on said information on said first set, said information on said second set and said information on said at least one further set, such that said search sub-tree indicates next valid characters for a subset of said first set, a subset of said second set, and a subset of said at least one further set; and
generating at least one further search tree based on said information on said at least one further set, such that a node of said at least one further search tree references said search sub-tree.

10. A navigation device, comprising:
an input interface configured to receive character input in a sequential manner;
a data base storing plural search trees which respectively indicate next valid characters for a name input received at said input interface, wherein a first search tree has a first node referencing a search sub-tree and a second search tree has a second node referencing the same search sub-tree, wherein the first search tree and second search tree comprise different search trees having no common nodes, wherein only one instance of the search sub-tree is stored in the data base for the first search tree and the second search tree; and
a processing device coupled to said input interface and said data base to perform a next valid character search, said processing device being configured
to determine, when a character input is received at said input interface, next valid characters using at least one of said plural search trees stored in said data base; and
to selectively continue said next valid character search in said search sub-tree when reaching either one of said first node of said first search tree or said second node of said second search tree.

11. The navigation device of claim 10, wherein the data base stores plural search sub-trees, each of which is respectively referenced by nodes of at least two different search trees.

12. The navigation device of claim 10, wherein said processing device is configured to pre-load said search sub-tree prior to reaching said first node or said second node in said next valid character search.

13. The navigation device of, claim 10, wherein said search sub-tree is included in one of said first search tree and said second search tree.

14. The navigation device of claim 10, wherein said search sub-tree is stored in said data base separately from said first search tree and said second search tree.

15. The navigation device of claim 10, wherein each one of said first and second search trees indicates next valid characters for country names, city names, street names, or names of points of interest (POI).

* * * * *